United States Patent
Liu et al.

(10) Patent No.: US 12,232,073 B2
(45) Date of Patent: Feb. 18, 2025

(54) METHOD AND SYSTEM FOR SEARCHING AND LOCATING RADIO DEVICES

(71) Applicant: Kabushiki Kaisha Toshiba, Tokyo (JP)

(72) Inventors: Xingchi Liu, Bristol (GB); Ziming Zhu, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 375 days.

(21) Appl. No.: 17/660,674

(22) Filed: Apr. 26, 2022

(65) Prior Publication Data

US 2023/0345405 A1 Oct. 26, 2023

(51) Int. Cl.
*H04W 64/00* (2009.01)
*H04B 17/318* (2015.01)

(52) U.S. Cl.
CPC .......... *H04W 64/00* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 8,072,311 B2* | 12/2011 | Sadr | ........................ | G01S 5/12 340/539.22 |
| 2005/0032531 A1* | 2/2005 | Gong | .................. | G01S 5/02521 342/357.29 |
| 2005/0246334 A1* | 11/2005 | Tao | ....................... | H04W 64/00 707/999.005 |

FOREIGN PATENT DOCUMENTS

CN 111127514 A 5/2020

OTHER PUBLICATIONS

Frazier, "A Tutorial on Bayesian Optimization", arXiv preprint arXiv:1807.02811, 22 pages, 2018.
Rasmussen, "Gaussian Processes in Machine Learning", Summer School on Machine Learning, pp. 63-71, 2003.
Thompson, "On the Likelihood That One Unknown Probability Exceeds Another in View of the Evidence of Two Samples", Biometrika 25, No. 3/4, pp. 285-294, 1933.
Kandasamy et al., "Parallelised Bayesian Optimisation via Thompson Sampling", International Conference on Artificial Intelligence and Statistics, pp. 133-142, 2018.
Jones et al., "Efficient Global Optimization of Expensive Black-Box Functions", Journal of Global Optimization 13, pp. 455-492, 1998.
Shahriari et al., "Taking the Human Out of the Loop: A Review of Bayesian Optimization", Proceedings of the IEEE, vol. 104, No. 1, Jan. 2016, pp. 148-175.

* cited by examiner

*Primary Examiner* — Adolf Dsouza
(74) *Attorney, Agent, or Firm* — Oblon, McClelland, Maier & Neustadt, L.L.P.

(57) ABSTRACT

A method is disclosed for searching and locating a target device emitting a wireless signal. The signal strength of the wireless signal is detectable and measurable. The method comprises defining a distribution of the signal strength within the search area, on the basis of an initial condition, then iteratively performing steps of interrogating the distribution to determine a plurality of inquiry locations, determining signal strength at those inquiry locations, and updating the distribution on the basis of the determined signal strengths. Iteration continues until a convergence condition is reached, whereby inquiry locations become proximate within a threshold.

8 Claims, 8 Drawing Sheets

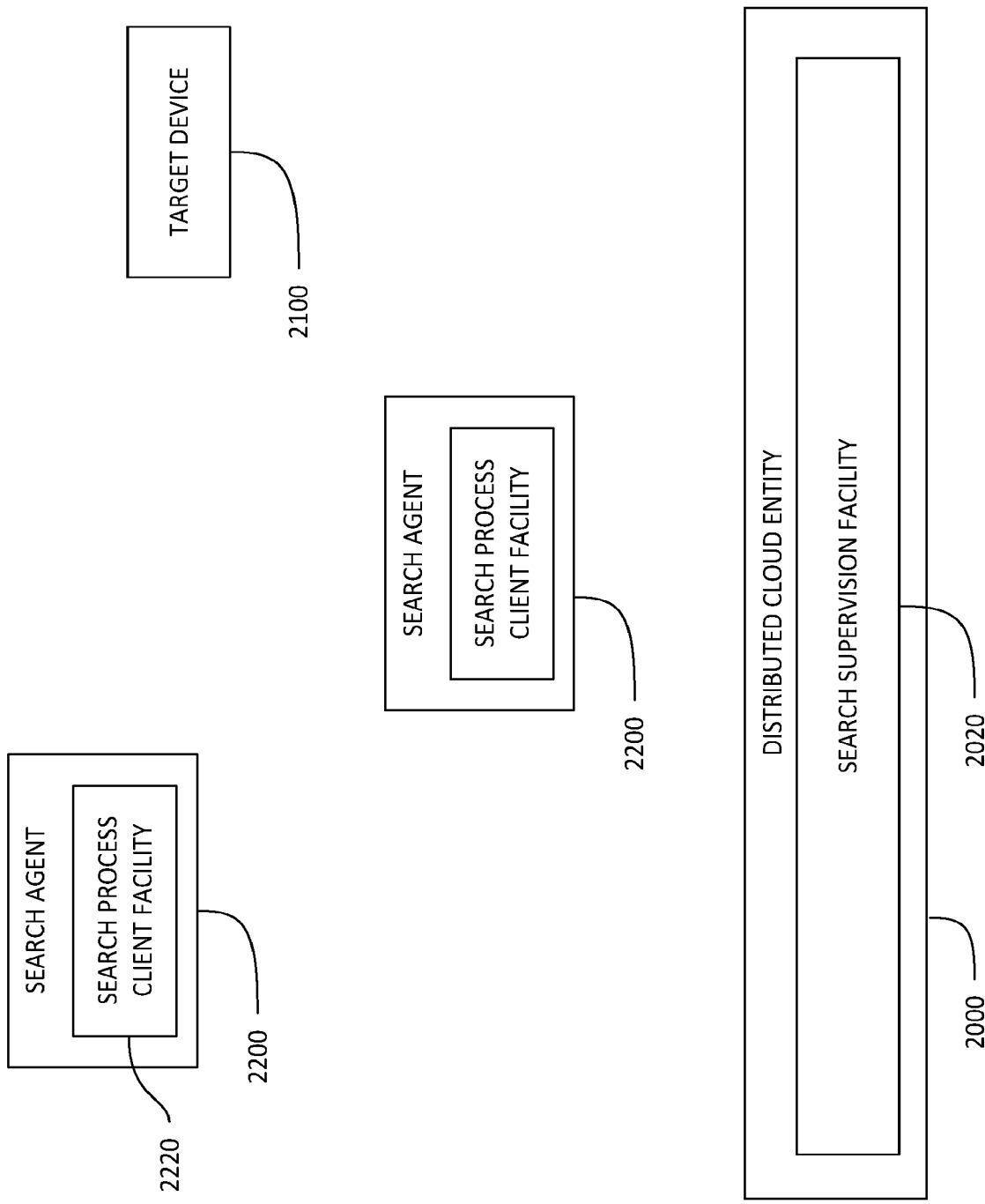

METHOD AND SYSTEM FOR SEARCHING AND LOCATING RADIO DEVICES

FIELD

The present disclosure concerns apparatus, systems and methods for searching for and locating radio devices.

DESCRIPTION OF DRAWINGS

FIG. 8 is a system network architecture for a third embodiment.

DESCRIPTION OF EMBODIMENTS

Figure 1:
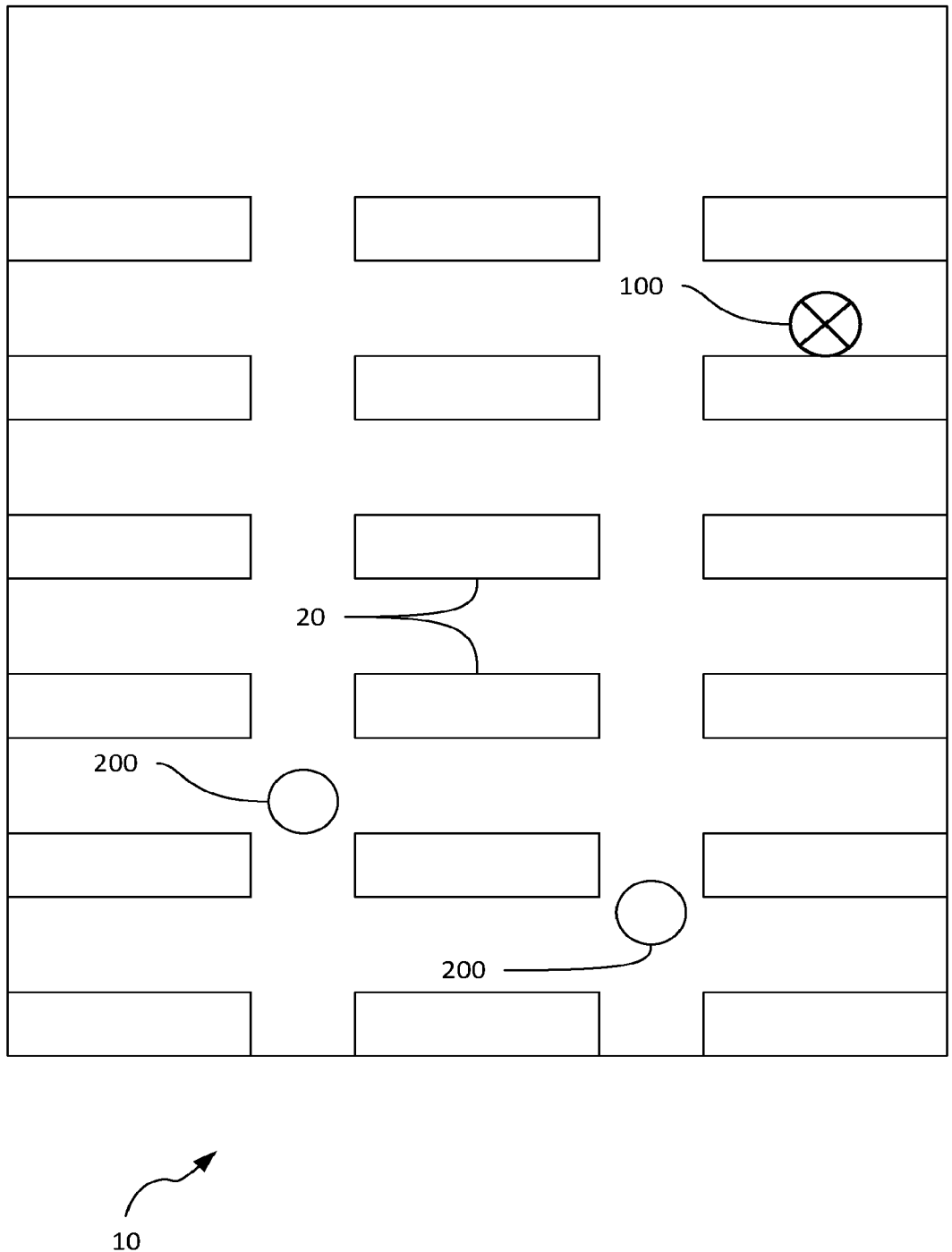
FIG. 1 is a plan view of a search environment in which embodiments are described.

Embodiments disclosed herein are concerned with a scenario in which a radio enabled device is situated in an environment of interest, while the precise location of the device is not determined.

Radio devices are becoming widely used in a wide range of scenarios. For instance, in a retail setting, it is becoming common for a retailer to issue a scanning device to a customer, so that the customer can scan his/her own items, thus easing the retail process for both customer and retailer. Similarly, in an industrial setting, it is common to issue a radio enabled device to a maintenance operative, so that maintenance data can be logged as the operative works, and so that messages to the operative can be issued. So, for example, an operative in a warehouse or factory may use a handheld radio device to carry out checking and maintenance operations.

In such situations, application specific devices may be designed so that the utility and user functionality of the device matches closely with the intended use. However, it may well be that utility and user functionality can be offered by running a software application (an "app") on a general purpose device such as a laptop, tablet or smartphone.

In such circumstances, and in many other scenarios which will be apparent to the reader, there is a prevailing risk that radio enabled devices may become mislaid in the operating environment. Devices can be left unattended, can be carelessly misplaced, or can be discarded. This could arise, for instance, if a retail customer were to abort a retail process and simply discard their hand-held scanning device at random before leaving the premises. Similarly, a maintenance operative could, in a number of circumstances, for instance through distraction or interruption, mislay their hand-held monitoring device in an operating environment.

Embodiments described herein seek to provide a way of enabling location of a radio device in an operating environment.

Aspects of the disclosure may be relevant to the field of "Internet of Things" (IoT).

Aspects of the disclosure may provide an object searching system and method which has low demand for infrastructure, and is operable with little or no information about the operating environment. Embodiments may implement a Bayesian optimisation (BO) algorithm, using a Thomson Sampling technique for inquiry point selection. BO enables solution of a computationally expensive black-box global optimisation problem, comprising an optimisation objective function whose derivative information (even in an analytical form) is not known and which would be time-consuming to evaluate. In the described embodiments, the location of a search agent within a search space is the input of the black-box function, and the value of RSS at that particular location is the output. The disclosure also provides a formulation of a BO process for maximising the RSS, and hence for considering the associated location as the true location of the target RF device.

In an embodiment, an RF object searching system comprises a searching agent and a search tool for directing the agent towards a target object within a search space. The search tool is operated to perform a search process, which is configured by an implementation of a portfolio Bayesian optimisation algorithm based iterative explore and search method.

In an embodiment, the searching agent comprises a movable device such as a mobile robot or an unmanned aerial vehicle. The movable device may be autonomous, thus enabling a control process to cause the device to be moved from one location to another.

The searching agent may be movable within the search space to collect radio information transmitted by the target device such as RSS.

An iterative Bayesian optimisation may determine the search process in terms of indicating points of search (the next location to take measurements) for the agent, according to the statistical property of currently available RSS information and a defined acceptance threshold.

The Bayesian optimisation algorithm may contain two stages.

In a first stage, a multiple point search is conducted to quickly converge the search space to a reasonably small area. Inquiry points are determined by a Thompson sampling (TS) based technique. The TS based inquiry point determination process may be performed multiple times, to select a required number of inquiry points. The process is performed sequentially. Later sampling in the process will exclude sampling a defined 'neighbourhood area' of the inquiry points selected by earlier sampling.

In a second stage, a one-point Bayesian optimisation is conducted until the process terminates according to set criteria. The inquiry point is determined by solving an acquisition function called expected improvement (EI), which is sufficiently greedy to enable guiding of the agent to the predicted object location. The object is then considered to be located when the algorithm terminates.

An embodiment is described in the context of a retail environment, in which scanners and point of sale (POS) machines are used in situations such as warehouses, or shopping showrooms. Such devices could be used by customers or staff. Devices can be occasionally left unattended, or may be laid down after use or on requiring service attention. The embodiment seeks to provide a way of locating such unattended or mislaid devices.

The reader will appreciate the applicability of this disclosure to other use cases. Object localisation and tracking are important applications of present development of "Internet of Things" (IoT) technologies. Devices such as monitors and sensors may be placed in an environment and then may be mislaid or their location forgotten.

The present disclosure provides embodiments which comprise an object searching system and method that requires minimal infrastructure and set up, and able to operate without significant prior knowledge of the search space.

FIG. 1 illustrates a plan view of a bounded space, in this example a warehouse 10 in which a plurality of shelving units 20 for storing stock are situated. A target device 100 is located within the bounded space 10, continuously emitting a radio signal at a known frequency. In this example, the target device 100 is a hand-held scanning unit enabled for WiFi communication, and the target device 100 therefore emits a WiFi signal.

As depicted, a plurality of mobile radio receivers 200, serving as searching agents, are movable within the space, and can be used to measure received signal strength (RSS). Based on the measurement, a statistical model of the RSS in the bounded search space 10 can be built and updated. The location of the target device 100 can be predicted, based on the updated model, as well as the next inquiry point for a next iteration of the model updating process. When a termination condition of the updating process is met, for example, a threshold on the value of mean and variance of the estimated RSS at a location, or, when the next inquiry point is close enough to the current predicted object location, the predicted location is treated as the location of the target.

In this example, two search agents 200 are used to obtain RSS data at two different locations (two inquiry points) at each iteration during the first stage of the search, then one of these agents is used in the second stage to improve efficiency of the BO algorithm and reduce searching time.

The reader will appreciate that a single agent 200 could be used, in which the same agent is used to collect RSS data from two points before performing the BO.

The setting of a boundary of first and second stages is specific to the implementation.

Figure 2:
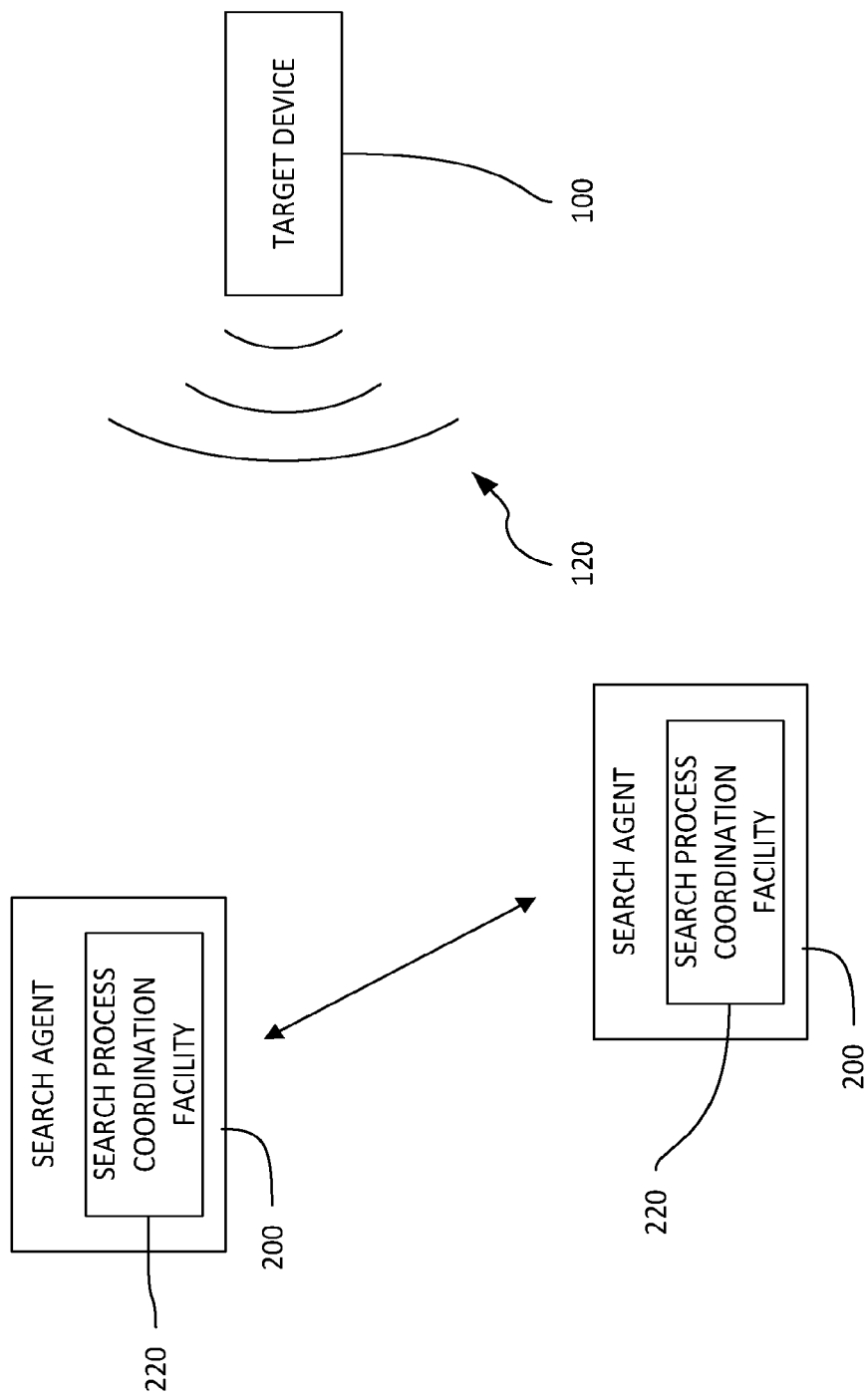
FIG. 2 is a system network architecture for a first embodiment.

The disclosure contemplates a number of different ways in which the searching process can be implemented. As shown in FIG. 2, the two search agents 200 each host and execute software to implement a search process coordination facility 220 and, with suitable communication established between the two search agents (such as by WiFi or other means of radio communication), the search process can be established as a distributed process.

Each search agent 200 as illustrated in FIG. 2 therefore contributes to an overall process run in a distributed and coordinated manner by the respective search process coordination facilities 220. In general terms, the search agents 200 detect and measure RSS consequent from a WiFi emission 120 of the target device 100.

The RSS measurements can provide the search process with an estimate as to the location of the target device, that is, the location in the bounded search area 10 that is predicted to have the highest RSS. This prediction is established by a Bayesian optimization-based algorithm, as will be described in due course, which can model and calculate the relationship between location and measured RSS.

The Bayesian model can be updated based on the observed RSS data in an iterative manner. Each time a search agent 200 moves to a position, it collects RSS data, conducts the BO calculation, and then moves to a new position (the next inquiry point) suggested by the Bayesian model. After a number of iterations of this process, and deploying at a number of inquiry points, the BO algorithm can make an accurate estimation of the object location.

Figure 3:
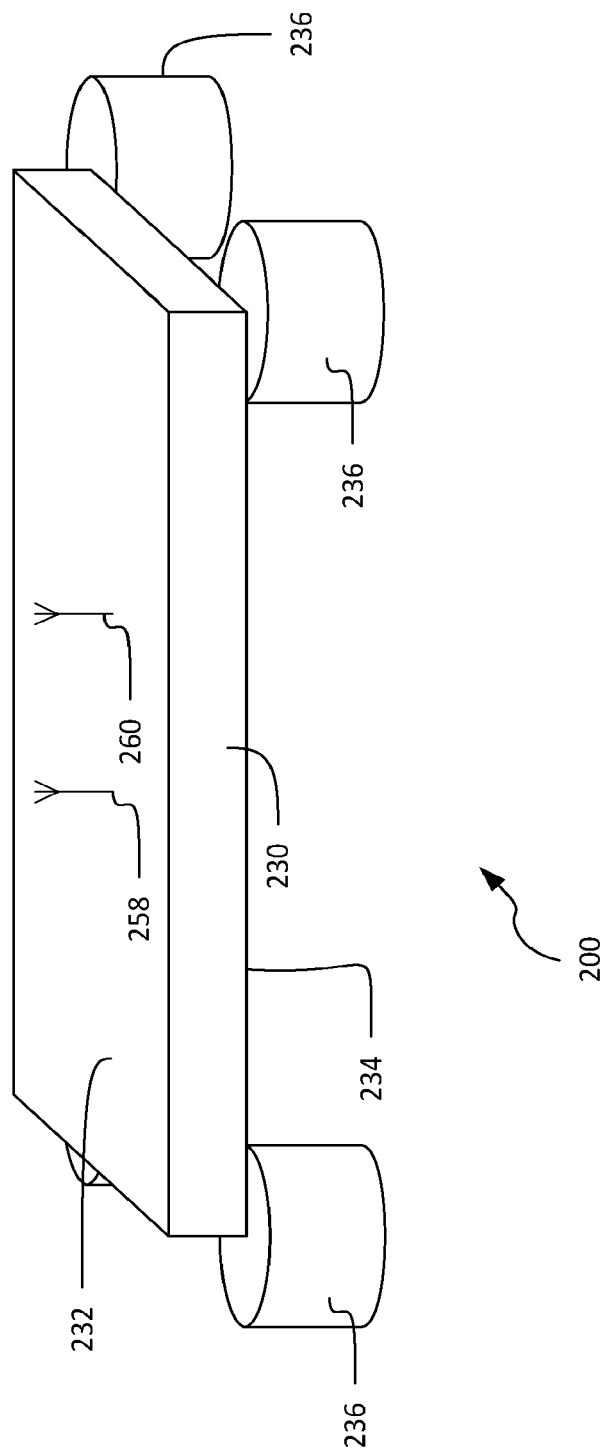
FIG. 3 is a side view of a search agent of the first embodiment.

As shown in FIG. 3, each search agent 200 is an unmanned aerial vehicle (UAV) which is in the form of a quadcopter drone. The search agent 200 comprises a generally cuboidal body 230, with upper and lower faces 232, 234. A rotor 236 is mounted at each corner of the lower face 234; the rotors 236 are axially parallel with each other.

Two antennas 258, 260 are mounted on the upper face 232. The first antenna 258 is for transmitting and receiving WiFi signals. The second antenna 260 is for cellular signals such as on the 5G network.

Figure 4:
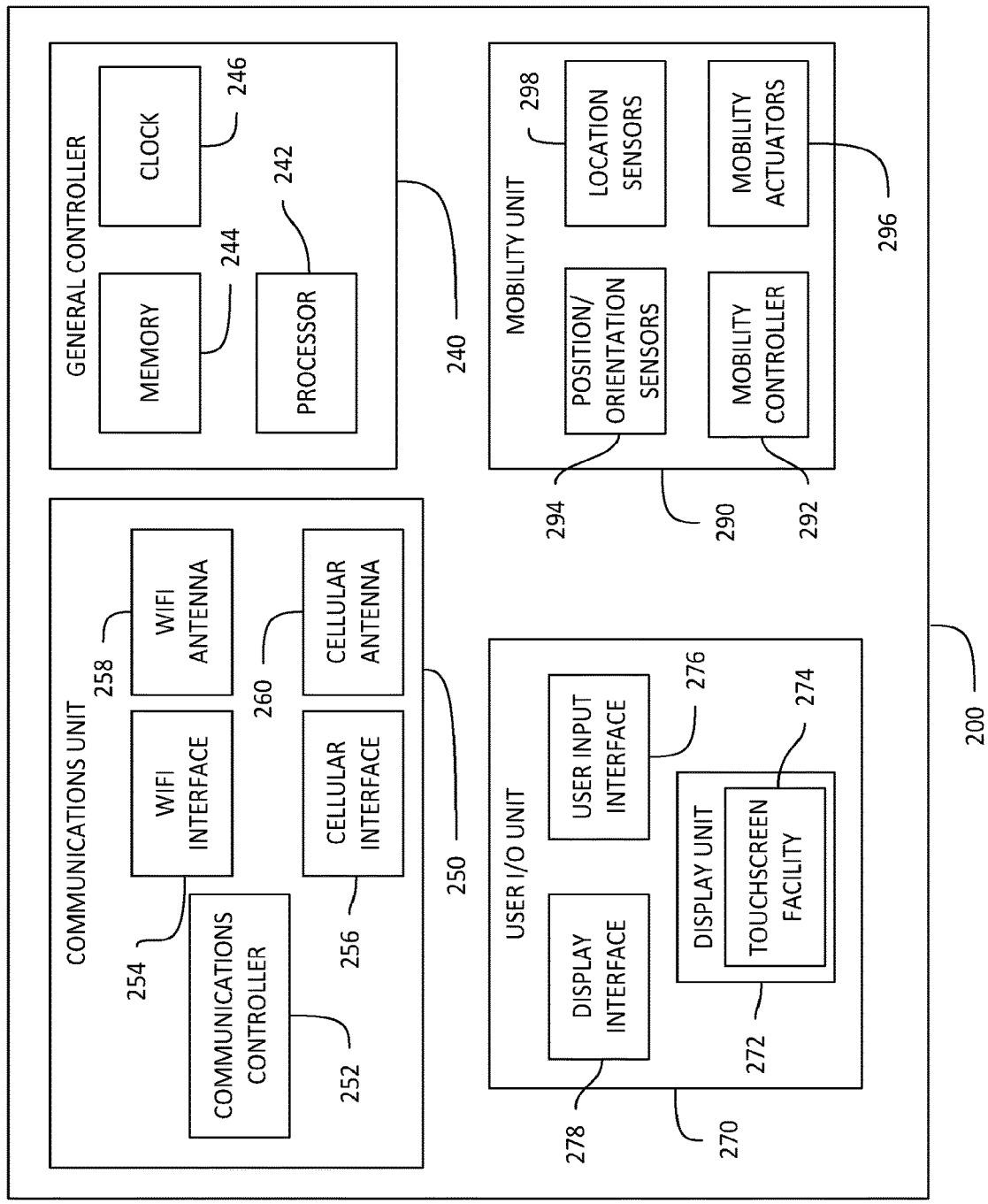
FIG. 4 illustrates the structure and function implemented within the search agent of FIG. 3.

FIG. 4 illustrates the structure and function implemented within each search agent 200. As shown, there are four main functional elements, i.e. a general controller 240, a communications unit 250, a user input/output (I/O) unit 270 and a mobility unit 290.

The general controller 240 has overall responsibility for control and execution of processes on the search agent 200. As such, it comprises a processor 242 operable to execute processor executable instructions. Processor executable instructions may be stored in memory 244 which may comprise, as required, RAM and ROM, of various types, such as fast access or mass storage, as the need arises. Processor executable instructions, and data held in the pursuit of desired functionality, may be introduced to the memory 242 by pre-loading during manufacture, or by downloading to the search agent during or prior to commencement of operation, for instance conveyed by a suitable signal from a remote server. Means may also be provided for connection of a mass storage device to the search agent, such as a USB storage stick, to allow introduction of further computer programs, updates or data.

A clock 244 provides a clock signal for coordination of execution of program instructions, and other operational features of the search agent 200.

The communications unit 250 enables the search agent 200 to communicate with other devices, and to receive and process signals from other devices. In the context of the present embodiment, two main communications technologies are implemented—namely WiFi™ and 5G™. WiFi is based on the IEEE 802.11 family of standards, promoted and governed by the WiFi Alliance of Austin, Texas, USA. 5G is an implementation of cellular communication, developed by the $3^{rd}$ Generation Partnership Project (3GPP), a consortium of standards setting organisations, with its administrative function at the European Telecommunications Standards Institute (ETSI) at Sophia-Antipolis, France.

As will be understood by the reader, WiFi functionality is useful for short distance communication, and is the basis by which signals from the target device 100 will be detected. 5G communication is adapted for use over longer distances, with cellular base stations, and is particularly contemplated for device-to-device communication in the pursuit of systems requiring minimal human intervention (the so-called "Internet of Things" concept).

To achieve this, the communications unit 250 comprises a communications controller 252 operable to coordinate communications functions on the search agent 200. A WiFi interface 254 provides means for converting WiFi signals received at the WiFi antenna 258, and for generating WiFi signals for transmitting at the WiFi antenna 258. Similarly, a 5G interface 256 provides means for converting 5G signals received at the 5G antenna 260, and for generating 5G signals for transmitting at the 5G antenna 260.

In the context of the present disclosure, the communications unit 250 is particularly concerned with detection of WiFi signals and measuring received signal strength (RSS) thereof.

A user input/output unit 270 implements functions to allow a user to provide configuration control input actions or to convey information to a user. To this end, the user I/O unit 270 comprises a display unit 272 incorporating a touch screen facility 274. The display unit 272 is driven by a display interface 278 to convey a graphical user interface to a user; the incorporated touch screen facility 274 is capable of receiving corresponding user input actions which can then be interpreted by a user input interface 276.

It will be appreciated that the user input/output unit 270, while described as an integrated unit of the search agent 200, could alternatively be implemented as a separate device. For instance, a user may have access to a smartphone, tablet, personal computer or other suitable device, on which an application (an "app") could be installed to provide user input/output functionality. Then, interaction with the search agent 200 could be effected by a suitable communication channel between the search agent 200 and the user device, such as by Bluetooth™ technology.

Finally, the mobility unit 290 provides physical mobility functions of the search agent 200. The mobility unit 290 is responsible for establishing a measure of the location of the search agent 200, moving the search agent 200 to a desired location, and maintaining the location of the search agent 200 to allow suitable observations to be made.

This is achieved through the provision of a mobility controller 292 which is operable to respond to general process control commands indicating a desire that the search agent 200 be located at a desired location. Position/orientation sensors 294 provide sensing feedback, such as geolocation and attitude sensing, to ensure that flight of the search agent 200 is safe within pre-set constraints and collision free. Mobility actuators 296 provide drive signals to the rotors 236 to enable flight on the desired flightpath to the desired location, and location sensors 298 provide a reading as to the actual location of the search agent 200 during flight and on arrival.

In this embodiment, the search agents 200 communicate with each other to implement the search process. The disclosure contemplates a pure peer-to-peer implementation, or a master-and-slave approach. Either are capable of producing the desired implementation.

Figure 5:
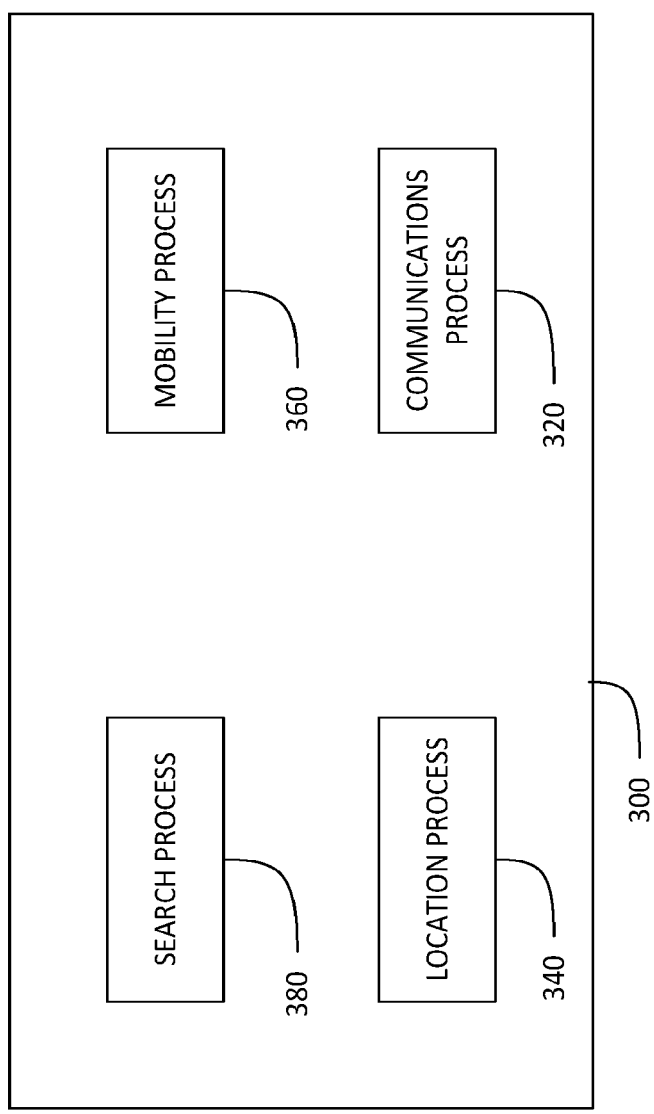
FIG. 5 illustrates processes implemented within the search agent of FIGS. 3 and 4.

As can be seen, the search agents 200 of the described embodiment establish four processes as shown in FIG. 5. These are part of the overall operational process 300 which will be described in due course. As will be understood by the reader, whether the processes are implemented by one of the search agents 200, with the other agent acting as a slave unit, or by the two search agents 200 acting in concert, is a matter of design choice. Other embodiments are also contemplated, as will be described in due course.

The operational process 300 thus comprises a communications process 320 intended to establish communication between the search agents 200 and to govern detection of WiFi signals emitted by the target device 100. The location process 340 establishes the precise location of the or each search agent 200, with respect to the desired location governed by the search process 380. A mobility process 360 establishes a manner in which the or each search agent 200 is to move to the desired location(s) to effect the search. Finally, the search process 380, as previously mentioned, governs the Bayesian search process by which received WiFi RSS readings are translated into a search strategy for identifying a location of the target device.

In this embodiment, the search process 380 is distributed between the two search agents 200. Thus, the search agents 200 exchange measured RSS readings for the target device 100. The search process 380 then causes calculation of the Bayesian optimisation (BO) in accordance with the embodiment, to produce updated inquiry locations for the search agents.

Within the BO, a Gaussian process (GP) is used for modelling the statistical distribution of RSS for every location in the search space. Because of this, only a very few RSS data observations are required to initialise the BO and searching process. Unlike many machine learning based RSS localisation algorithms, comprehensive prior knowledge of the environment is not required.

By using GP as the surrogate model of the black box function (the unknown relationship of location→RSS) it is possible to predict the RSS of any location in the search space, because the RSS of any location is assumed to follow a Gaussian distribution. Therefore, for each location, the predicted RSS value (mean) and the uncertainty of the prediction (variance) can be obtained.

TS is used to determine the next inquiry point. This obviates the need, such as in typical Bayesian optimization schemes, to solve an acquisition which requires more complex computation.

In this embodiment, two search agents 200 are used simultaneously in each iteration of BO. Alternatively, one search agent 200 could be used but measuring multiple inquiry points. This enables collection of more information concerning the search space and acceleration of the BO process at the beginning of the searching. A two-stage portfolio BO is disclosed below, to first identify the area of the object quickly by using two agents and the TS technique, and then in the second stage using one point BO where the inquiry point of each iteration is determined by optimising the EI acquisition function until the whole search process terminates.

Figure 6:
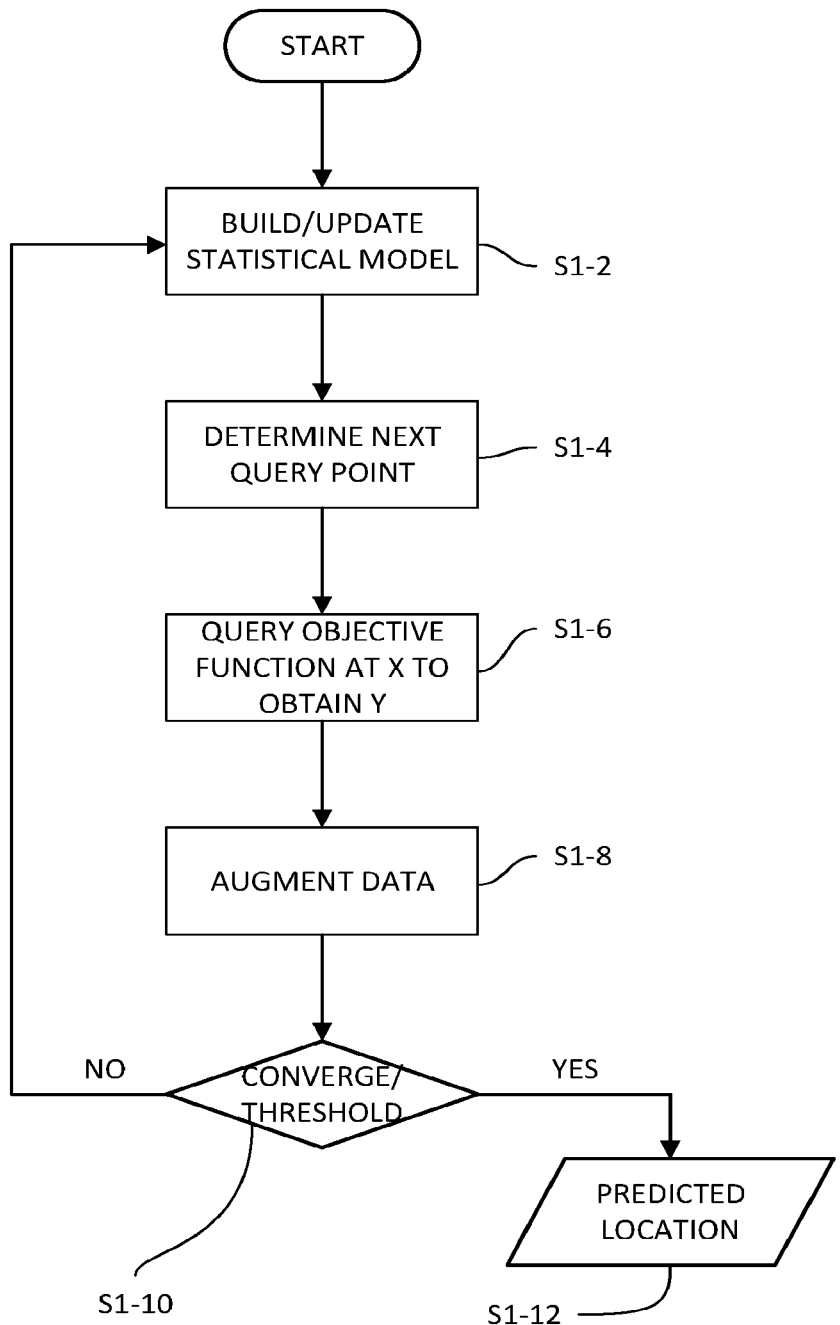
FIG. 6 is a flow diagram for a search process implemented in the processes of FIG. 5.

The searching procedure is illustrated in FIG. 6. At the beginning of the search process (S1-2), RSS data is collected by the agent at a small number of (e.g., two or four) different locations. The locations of measurements can be randomly chosen within the search space. The search agents 200 share their measurements with each other.

Based on the prior data, Gaussian process regression (GPR) is used to compute the posterior distribution of the RSS values in the search space. This distribution is a multivariate Gaussian distribution and the RSS of any point in the search space follows a one-dimensional Gaussian distribution. Note that the mean and the variance of this distribution can be calculated with closed forms. After that, several inquiry points will be selected (S1-4) based on the posterior distribution and multiple agents are set to measure the RSS values at the selected inquiry points simultaneously (S1-6). Based on the measured data, the posterior distribution is updated (S1-8) which is used for determining the agent's next inquiry point.

In the first few (set according to individual circumstances, e.g., size of search space) iterations, TS is employed to sample the multivariate Gaussian distribution for several times. Therefore, several different estimations of the RSS in the search space can be obtained. For all of the sampled RSS estimations, the maximum will be chosen, and its associated location will be selected as the inquiry point to be actually measured by the agent in the next iteration.

The above sampling process will be carried out multiple times to obtain multiple inquiry points. Compared to other existing parallel Bayesian optimization schemes, TS can determine inquiry points without the need of optimizing the acquisition function which can be very complex computationally.

Directly sampling the posterior distribution for multiple times cannot utilize the power of parallel Bayesian optimization efficiently. Because some inquiry points can be very close to each other and, in this case, the information gathered by using multiple agents is reduced. To improve the inquiry points selection efficiency, TS is performed sequentially, which means that, after selecting one inquiry point, the next TS process will not sample the 'neighbourhood space' of the previously selected inquiry point. Here, the neighbourhood space is defined as a circular region centred at an inquiry point, and the radius depends on the specific circumstances.

After the few iterations of the BO search, it can be expected that the location of the target can be narrowed down to a smaller feasible region. Now the TS-based scheme becomes less efficient since it may have to select the inquiry points outside the feasible region due to the neighbourhood setting. Therefore, a second stage of search commences, where the conventional EI technique is used to guide a single point inquiry until the whole BO process terminates.

A specific example will now be described of the use of a portfolio Bayesian optimization object searching algorithm in the searching process. Pseudocode is laid out below to describe the process.

```
Require: Prior probabilistic model GP(0, κ), D₁, T_th
    GP₁ ← GP(0, κ), t ← 1
    while t ≤ T do
        if t ≤ T_th then
            Sample g₁, g₂ ~ GP_t
            x_t¹ ← argmax_{x∈X} g₁(x)
            x_t² ← argmax_{x∈X\N} g₂(x)
            y_t¹, y_t² ← Query f at x_t¹, x_t²
            D_{t+1} ← D^t ∪ {(x_t¹,y_t¹), (x_t²,y_t²)}
        else
            x_t ← argmax_{x∈X} EI(x)
            y_t ← Query f at x_t
            D_{t+1} ← D^t ∪ {(x_t,y_t)}
        end if
        Update posterior GP_{t+1}
    end while
```

In this pseudocode, GP(0, κ) represents the defined GP with mean 0 and covariance matrix κ chose according to prior belief of the environment.

The set of available observed data at time (round) t is defined as $D_t$, and $T_{th}$ defines the boundary of the two stages (i.e., the number of iterations after which the second stage starts, in this example 6).

(x, y) represents the coordinates-RSS pairs. If at time 1 (initial stage) there are 2 measurements available, $D_1 = \{x^1, y^1; x^2, y^2\}$. The initial data is fed into the GP model to obtain $GP_1$.

In the first stage, the GP is sampled sequentially twice. To do this, first a set of points is uniformly selected in the whole search space. Since at each point, the RSS value must follow a specific one-dimensional Gaussian distribution as defined by the GP, a random number is generated following that specific Gaussian distribution, as a sample of this distribution, and as the estimated RSSs at that location.

When the sampling is done for all points, an estimation is obtained of RSS value for every location within the search space, denoted by g. This is a simple and effective method of sampling a GP. Other ways of sampling exist.

From the first sample $g_1$, the point $x_t^1 \in X$ is chosen that has the highest sampled RSS as one of the next inquiry location points from the whole search space X. From the second sampling, the point $x_t^2 \in X \setminus N_t$ is selected with the highest sampled RSS as the other next inquiry point, from the subspace $X \setminus N_t$, where $N_t$ represents the neighbourhood space of the previously selected inquiry point. This ensures that the two points chosen are not too close to each other.

In the second stage, the next inquiry point (this time, only one) is determined by optimizing the EI function. EI (x, incumbent(D_t), GP_t) is a well-known function in Bayesian optimisation.

Having determined the next inquiry point(s), the searching agent(s) 200 deploy to record RSS measurements at those locations. Together with current data, D_t+1 and GP_t+1 is updated. In both stages, the choice of methods for building/updating the GP model according to new data is widely available in the literature, hence not detailed here.

The process continues until T (the termination condition, e.g., running time limit) is reached.

The disclosed portfolio Bayesian scheme of the present embodiment combines both advantages of parallel BO and TS, by using the two-stage strategy and the revised TS. In terms of computational complexity, the use of multiple inquiry points could lead to the need to solve a non-convex optimisation problem in the process of selecting optimal inquiry points within the conventional BO (with EI). However, this can be avoided by applying the TS technique which is a low complexity sampling method.

While embodiments have hitherto been described with the search agents 200 acting semi-autonomously, the reader will appreciate that a more centralised approach is possible.

Figure 7:
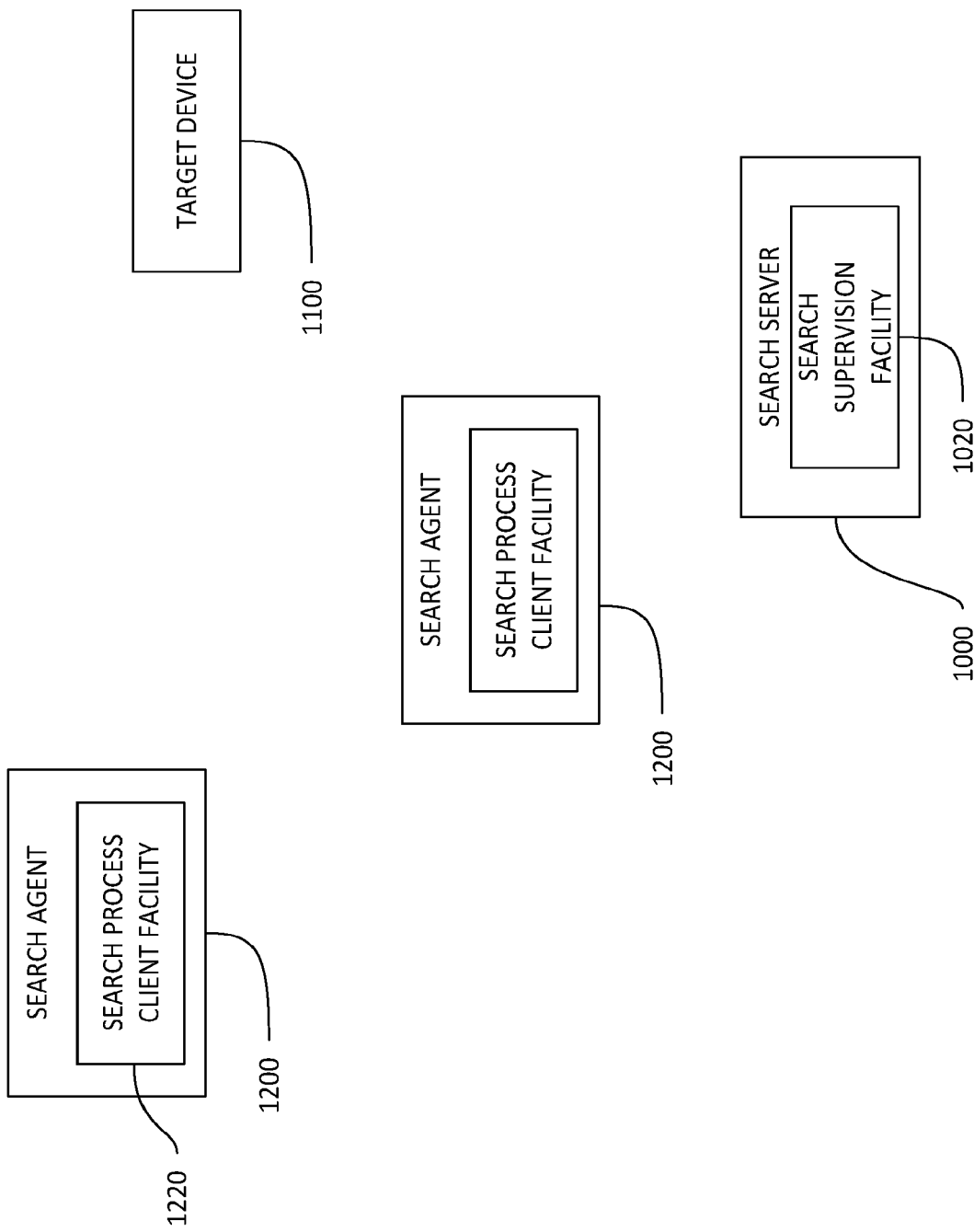
FIG. 7 is a system network architecture for a second embodiment.

So, for example, FIG. 7 illustrates an implementation whereby a target device 1100 can be located by the combination of search agents 1200 hosting respective search process client facilities 1220 and a search server 1000 hosting a search supervision facility 1020. As the reader will appreciate, the division of responsibilities between the search server 1000 and the search agents 1200 can be made in a number of different ways. For instance, the search server 1000 may implement most if not all of the search algorithm, and simply direct search agents 1200 to move to locations so that RSS measurements can be obtained.

In FIG. 8, a similar approach is taken. In this implementation, a target device 2100 can be located by the combination of search agents 2200 hosting respective search process client facilities 2220, whereas the previously described search server function is implemented by way of a distributed search supervision facility process 2020 hosted across distributed (cloud-based) servers 2000. The manner in which this is achieved will be well known to the reader versed in the field of edge computing.

While aspects, embodiments, variants and examples of the disclosure have been described in specific terms, nothing should be considered a binding statement as to the interpretation of the claims appended hereto. The reader will also appreciate, from the foregoing, that other embodiments may fall within the scope of the invention so claimed.

The invention claimed is:

1. A method of locating a target device, the target device emitting a wireless signal having a signal strength detectable within a search area, the method comprising:

A: Defining a distribution for the signal strength within the search area, the distribution being a Gaussian distribution and having an initial condition governed by prior knowledge of the search area, the signal strength of any location in the search area being assumed to follow the Gaussian distribution;

B: Interrogating the distribution to determine a plurality of inquiry locations in the search area, wherein each inquiry location is outside a neighbourhood space of any other inquiry location, the neighbourhood space being defined as a circular region centered at an inquiry location of the inquiry locations;

C: Determining a plurality of signal strengths at the inquiry locations based on a Bayesian optimisation algorithm which calculates a relationship between a location and a signal strength, the signal strengths corresponding to strengths of wireless signals emitted from the target device; and D: Updating the distribution based on the determined signal strengths;

such that:

the steps B through D are iterated until a convergence condition is reached, wherein the convergence condition includes a proximity of inquiry locations within a predetermined threshold.

2. A method in accordance with claim 1 wherein the step A comprises defining a distribution as a Gaussian distribution having a mean and a variance.

3. A method in accordance with claim 1 wherein the steps A through D are iterated for up to a maximum number of iterations and, in the event that the convergence condition has not yet been reached, a second set of steps is commenced, the method further comprising:

E: Interrogating the distribution to determine a single inquiry location in the search area;

F: Determining a signal strength at the inquiry location; and

G: Updating the distribution based on the determined signal strength;

wherein the steps E through G are iterated until the convergence condition is reached.

4. A method in accordance with claim 1 wherein the step B includes using an exploratory sampling to determine, sequentially, the plurality of inquiry locations.

5. A method in accordance with claim 4 further comprising, for each inquiry location, defining a neighbourhood region around the inquiry location such that a further inquiry location is determined outside the neighbourhood region of each prior determined inquiry location.

6. A method in accordance with claim 1 wherein the step C includes deploying a search agent to each inquiry location and measuring a signal strength at that location.

7. A system comprising one or more movable search agents, the one or more moveable search agents being operable to move within a search area and being operable to measure a signal strength of a signal emitted by a target device, the system being configured to perform a method in accordance with claim 1.

8. A search device operable to move within a search area and being operable to measure a signal strength of a signal emitted by a target device, the search device being configured to perform a method in accordance with claim 1.

* * * * *